March 24, 1953  C. PANTER  2,632,550
ESCALATOR HANDRAIL DRIVE
Filed Nov. 9, 1950  2 SHEETS—SHEET 1
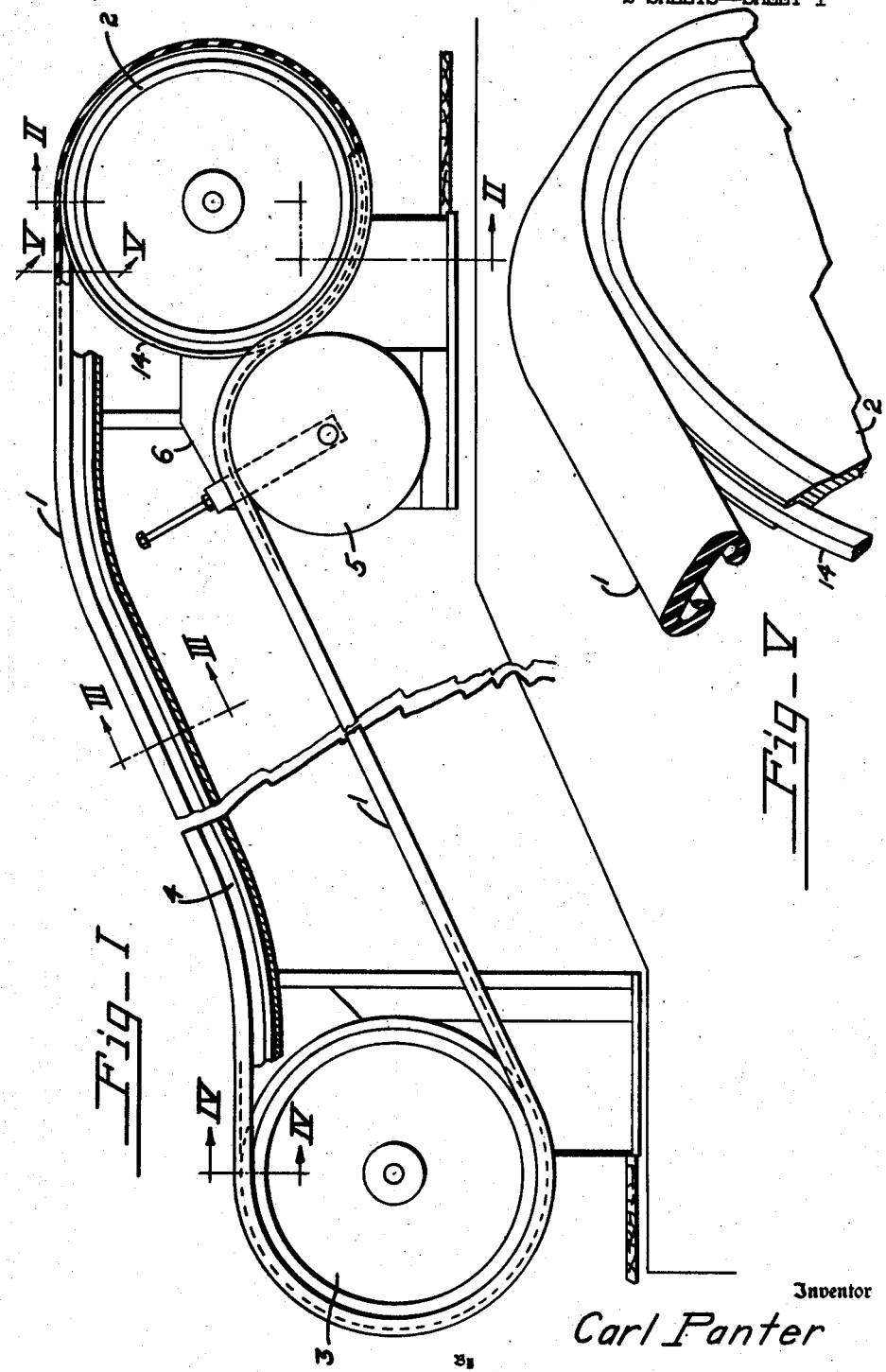
Inventor
Carl Panter
Marshall & Marshall
Attorneys

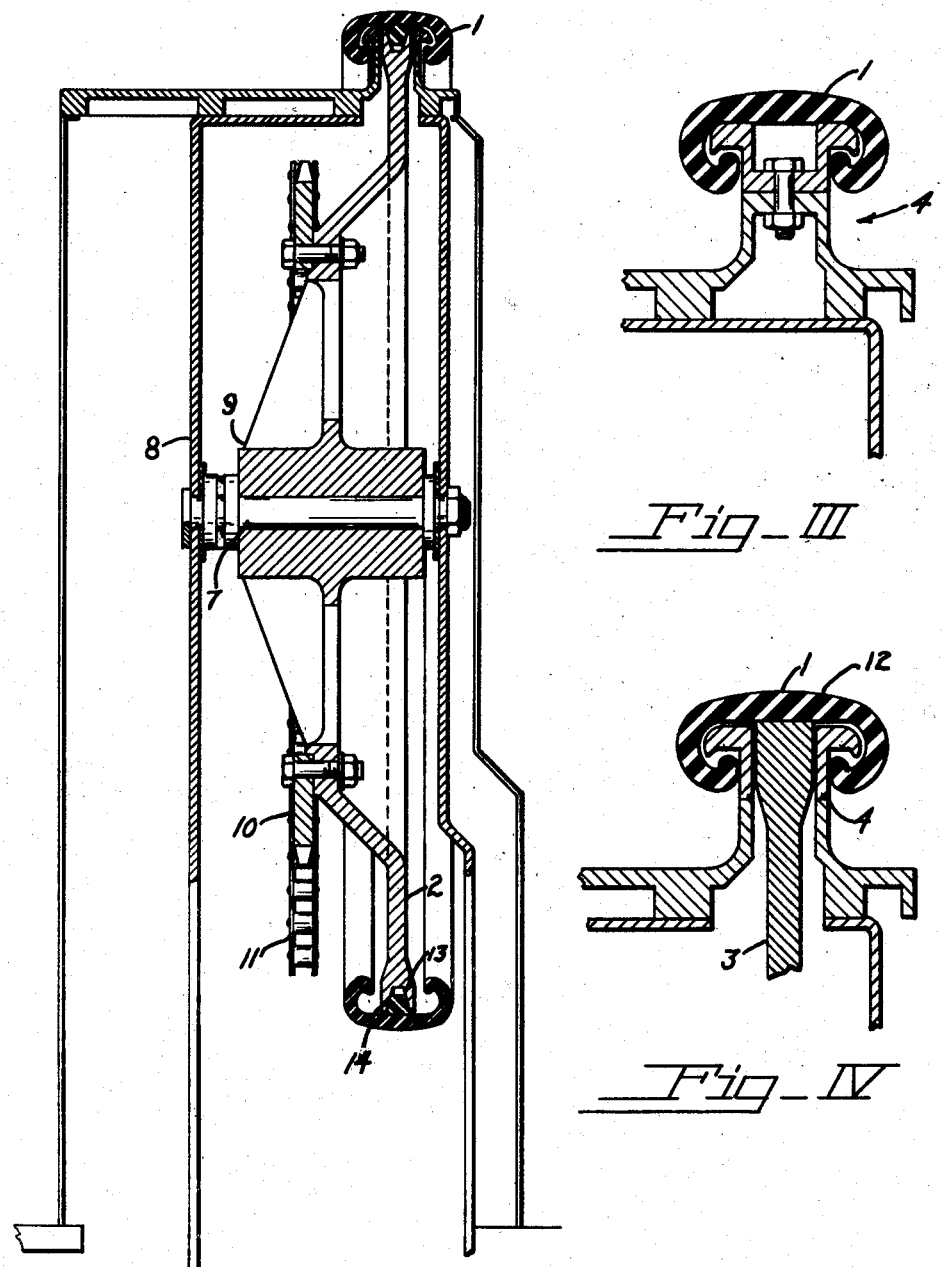

Patented Mar. 24, 1953

2,632,550

UNITED STATES PATENT OFFICE 2,632,550

ESCALATOR HANDRAIL DRIVE

Carl Panter, Toledo, Ohio, assignor to Haughton Elevator Company, Toledo, Ohio, a corporation of Ohio Application November 9, 1950, Serial No. 194,851

3 Claims. (Cl. 198—16)

This invention relates to escalators and in particular to an improved means for driving an escalator handrail.

Escalators must, for the convenience and safety of the passengers, be equipped with convenient handrails that move in step with the step carts of the escalator. Moving handrails for escalators are preferably constructed of fabric molded in rubber and have a cross section similar to a capital letter C with or without a V-shaped center rib like the center portion of a capital letter E. This cross section is selected so that the handrail may be carried on and guided by a guide rail having a generally T-shaped cross section that fits within the C-shaped cross section of the handrail. If the handrail has an integral central rib the guide rail is provided with a trough to accommodate the rib. While it is expensive to construct a handrail with an E-shaped cross section, this type of handrail is used because the center section may be made with an exposed rubber surface that matches a V groove in a drive sheave for positive drive. The fabric material (similar to the cord structure of an automobile tire) of the handrail is exposed on those portions of the interior of the handrail that run on the guide rail. This selection of materials is employed to minimize the friction between the handrail and the guide rail and, at the same time, increase the driving force between the sheave and the handrail as much as possible.

It has also been proposed that the center rib of the handrail be omitted and that a rubber tread be bonded to the sheave to provide a highly tractive surface to engage the fabric surface of the handrail and provide adequate driving force. It is difficult and expensive to bond the rubber treads to the sheaves and also difficulty is experienced in use since the treads occasionally break loose thus seriously reducing the driving effort applied to the handrail.

The principal object of this invention is to provide a tire or belt of high co-efficient of friction material that is mechanically guided onto or held on the rim of a drive wheel and that has a peripherally exposed surface to engage and drive the fabric surface of the interior to an escalator handrail.

Another object of the invention is to provide an intermediate member of high friction material between a drive wheel of an escalator and a handrail running on the drive wheel.

A still further object of the invention is to provide a rubber surfaced V-belt that is a close fit on the periphery of a V-grooved drive sheave and that supports and drives a handrail carried over the sheave.

More specific objects and advantages are apparent from the following description of a preferred embodiment of the invention.

According to the invention the drive wheel of an escalator handrail receives a belt or tire having a surface of rubber or similar high friction material between the periphery of the wheel and the fabric interior of a molded handrail carried on the surface of the belt as it travels around the handrail drive wheel.

In this manner advantage is taken of the low coefficient of friction between the fabric surface of the handrail and the guide rails at the same time that an easily constructed positive drive is maintained between the drive wheel and the handrail.

A preferred embodiment of the invention is illustrated in the accompanying drawings.

In the drawings:

Figure I is a side elevation, partly in section, of the handrail portion of an escalator.

Figure II is an enlarged vertical section of the drive sheave of the handrail as seen from the line II—II of Figure I.

Figure III is a fragmentary section showing the handrail on its guide as seen from the line III—III of Figure I.

Figure IV is a fragmentary section of the handrail as it is carried over a wheel or pulley at the lower end of the escalator, the section being taken along the line IV—IV of Figure I.

Figure V is a fragmentary perspective view of a portion of the handrail, drive wheel, and an intermediate tire or drive member as seen from the line V—V of Figure I.

These specific figures and the accompanying description are intended merely to illustrate the invention but not to impose limitations on its scope.

In a typical escalator installation embodying the invention a handrail 1 in the form of a long endless belt having a C-shaped cross section is trained over a drive wheel or sheave 2 at the upper landing of the escalator and over an idle wheel or sheave 3 at the lower landing of the escalator. On its upper run the handrail 1 is carried on and guided by a guide rail 4 that follows parallel to the path of the step carts of the escalator. As seen in Figure III, the guide rail 4 has a generally T-shaped cross section that fits within the generally C-shaped cross section of the handrail 1 so that the handrail cannot be lifted or displaced laterally from the guide rail.

The guide rail 4 is preferably constructed of some material that will take a high polish and thus minimize the frictional drag on the handrail 1. The guide rail 4 extends substantially tangentially from the drive and idle sheaves 2 and 3 so that the handrail 1 is firmly supported during all times that it may be grasped by a passenger on the escalator.

On its lower run the handrail 1 is carried over a tension sheave 5 adjustably mounted in a frame 6 adjacent the drive sheave 2. Except in long flights where intermediate supports are employed, the handrail 1 runs free of support from the tension sheave 5 to the idle sheave 3.

The drive sheave 2 and the idle sheave 3 are carried on axles mounted on frames within the balustrading of the escalator. A typical construction for the upper landing is shown in Figure II. As illustrated, an axle 7 is mounted in a U-shaped frame 8 in position to carry the drive sheave 2. The drive sheave 2 includes a heavy hub portion 9 to provide adequate bearing surface and stability against tipping and an annular sprocket 10 that is driven by a drive chain 11 operatively connecting it to the escalator drive mechanism.

The idle sheave 3 is similarly mounted in the balustrading at the lower landing and is similar to the drive sheave 2 except that it has a flat peripheral portion 12 (Figure IV) that engages the inner surface of the handrail 1 and lifts it clear of the adjacent portion of the guide rail 4.

Referring again to Figure II, the drive sheave 2 has rims forming a V-groove 13 adapted to receive a V-belt or tire 14 that extends radially beyond the periphery of the sheave 2 and that carries the handrail 1 as it travels around the sheave 2. The V-belt 14 is preferably constructed of rubber either with or without reinforcing cords and has a length generally equal to the circumference of the drive sheave 2. The V-belt 14 serves as a tire mechanically mounted on the drive sheave 2 and held in driving relation with the sheave by the pressure exerted by the tension in the handrail 1. The V-belt or tire 14 may, if desired, have a length slightly greater than the periphery of the sheave 2 in which case it creeps with respect to the sheave with the unrestrained portion bulging out away from the sheave when it is freed from the pressure of the handrail. If the length of the belt or tire is much greater than the circumference of the sheave it is necessary to provide guide means to train the belt back onto the sheave. Preferably the V-belt or tire 14 is constructed of rubber or similar material without reinforcing cords and of a length such that it may be stretched slightly and snapped into place in the groove of the sheave 2. Regardless if the belt is a snap fit or a loose fit on the sheave the driving action is produced by wedging the belt into the V-groove by the pressure exerted by the handrail.

This particular construction is very economical in that the belts may be easily molded to size with a wide tolerance allowable in manufacture, and the drive from the wheel or sheave to the handrail is made extremely positive because of the high co-efficient of friction existing between the surface of the belt or tire 14 and the fabric surface of the handrail 1.

Various modifications in cross sectional shape of the belt or tire 14 and in its length may be made without losing the advantages of an easily replaced tire that serves as an intermediate member between a drive and a driven member each having surfaces of relatively low co-efficient of friction. Thus all of the advantages of a smooth guide rail with an easy running handrail are retained while still providing a positive drive from the drive sheave.

Having described the invention, I claim:

1. In an escalator handrail drive, in combination, a handrail of C-shaped cross section, a wheel that is driven by the escalator drive mechanism, a V-belt generally trapezoidal in section and having a length less than the length of the handrail, said wheel having a peripheral V-groove to receive the V-belt with the V-belt engaging the sides only of the V-groove and projecting radially beyond the rim of the wheel, and means for guiding the handrail onto the wheel with the V-belt interposed between the wheel and the rail.

2. In an escalator handrail drive, in combination, a handrail of C-shaped cross section, a wheel that is driven by the escalator drive mechanism, said wheel having a peripheral V-groove, a resilient V-belt generally trapezoidal in section frictionally engaged in and supported by the sides only of the V-groove and having a portion extending radially outside the groove, and means for guiding the handrail onto the wheel with the V-belt in driving contact with the flat inner surface of the handrail.

3. In an escalator handrail drive, in combination, a handrail of C-shaped cross section, a wheel that is driven by the escalator drive mechanism, a circumferential groove in the periphery of the wheel, means for guiding the handrail onto the wheel, and a resilient member generally trapezoidal in section that is interposed between and that frictionally engages the side walls only of the groove and the handrail and that is held in driving engagement with the side walls by radial force transmitted from the handrail through the member to the walls of the groove.

CARL PANTER.

REFERENCES CITED

The following references are of record in the file of this patent:

UNITED STATES PATENTS

| Number | Name | Date |
|---|---|---|
| 2,028,358 | Shonnard | Jan. 21, 1936 |
| 2,225,772 | Dunlop | Dec. 24, 1940 |

FOREIGN PATENTS

| Number | Country | Date |
|---|---|---|
| 202 of 1903 | Great Britain | June 18, 1903 |